United States Patent
Lee et al.

(10) Patent No.: US 8,849,009 B2
(45) Date of Patent: Sep. 30, 2014

(54) IMAGE PROCESSING METHOD AND APPARATUS, IMAGE REPRODUCING METHOD AND APPARATUS, AND RECORDING MEDIUM

(75) Inventors: Jae-jun Lee, Suwon-si (KR); Jae-seung Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 919 days.

(21) Appl. No.: 12/275,627

(22) Filed: Nov. 21, 2008

(65) Prior Publication Data

US 2009/0232389 A1    Sep. 17, 2009

(30) Foreign Application Priority Data

Mar. 12, 2008    (KR) .................. 10-2008-0022999

(51) Int. Cl.
| | |
|---|---|
| G06K 9/00 | (2006.01) |
| G06K 9/36 | (2006.01) |
| G06T 15/00 | (2011.01) |
| H04N 13/02 | (2006.01) |
| H04N 11/02 | (2006.01) |
| H04N 7/00 | (2011.01) |
| H04N 5/92 | (2006.01) |
| H04N 13/00 | (2006.01) |

(52) U.S. Cl.
CPC ...... *H04N 13/0066* (2013.01); *H04N 2213/003* (2013.01); *H04N 13/0048* (2013.01)
USPC .......... 382/154; 382/276; 345/419; 386/245; 348/46; 348/435.1; 348/478

(58) Field of Classification Search
USPC ............... 386/239, 245; 380/226; 348/384.1, 348/426.1, 432.1, 434.1, 435.1, 469, 473, 348/476–479; 382/100, 154, 276–277, 285, 382/291, 305
See application file for complete search history.

(56) References Cited

U.S. PATENT DOCUMENTS

| | | | | |
|---|---|---|---|---|
| 5,581,614 | A | * 12/1996 | Ng et al. | ......................... 380/239 |
| 6,590,573 | B1 | 7/2003 | Geshwind | |
| 7,999,844 | B2 | * 8/2011 | Richards | ......................... 348/42 |
| 8,077,964 | B2 | * 12/2011 | Berestov et al. | ............... 382/154 |

(Continued)

FOREIGN PATENT DOCUMENTS

| | | |
|---|---|---|
| CN | 1799267 A | 7/2006 |
| JP | 7-255068 A | 10/1995 |

(Continued)

OTHER PUBLICATIONS

Daribo, I.; Tillier, C.; Pesquet-Popescu, B., "Distance Dependent Depth Filtering in 3D Warping for 3DTV," Multimedia Signal Processing, 2007. MMSP 2007. IEEE 9th Workshop on , vol., No., pp. 312,315, Oct. 1-3, 2007.*

(Continued)

*Primary Examiner* — Randolph I Chu
*Assistant Examiner* — Nathan Bloom
(74) *Attorney, Agent, or Firm* — Sughrue Mion, PLLC

(57) ABSTRACT

Provided are an image processing method and apparatus, and an image reproducing method and apparatus. The image processing method includes receiving three-dimensional (3D) image data; generating additional information about the 3D image data; and inserting the additional information in a blanking interval of the 3D image data.

26 Claims, 3 Drawing Sheets

(56) References Cited

U.S. PATENT DOCUMENTS

| | | | |
|---|---|---|---|
| 2004/0032488 A1* | 2/2004 | Harman | 348/51 |
| 2004/0101043 A1* | 5/2004 | Flack et al. | 375/240.01 |
| 2006/0269226 A1* | 11/2006 | Ito et al. | 386/95 |
| 2007/0165304 A1 | 7/2007 | Tomita | |
| 2007/0296859 A1* | 12/2007 | Suzuki | 348/473 |
| 2008/0031590 A1* | 2/2008 | Kulas | 386/92 |

FOREIGN PATENT DOCUMENTS

| | | | |
|---|---|---|---|
| JP | 2002-95018 | A | 3/2002 |
| KR | 10-2006-0041171 | A | 5/2006 |
| KR | 10-2007-0061227 | A | 6/2007 |
| KR | 10-2007-0103969 | A | 10/2007 |
| WO | 9641311 | A2 | 12/1996 |
| WO | 9930280 | A1 | 6/1999 |
| WO | 0101348 | A1 | 1/2001 |

OTHER PUBLICATIONS

Akar, G.B.; Tekalp, A.M.; Fehn, C.; Civanlar, M.R., "Transport Methods in 3DTV—A Survey," Circuits and Systems for Video Technology, IEEE Transactions on , vol. 17, No. 11, pp. 1622,1630, Nov. 2007.*

Communication dated Feb. 3, 2012 issued by the State Intellectual Property Office of P.R. China in Chinese Patent Application No. 200880125936.X.

Office Action issued Jul. 30, 2012 by the State Intellectual Property Office of the People's Republic of China in counterpart Chinese Application No. 200880125936.X.

Communication dated Mar. 15, 2013 from the European Patent Office in counterpart application No. 08873334.0, 11 pages.

Communication dated Sep. 17, 2013 issued by the State Intellectual Property Office of the People's Republic of China in counterpart Chinese Patent Application No. 200880125936.X.

Communication dated Dec. 19, 2013, issued by the Korean Intellectual Property Office in counterpart Korean Application No. 10-2008-0022999.

Communication dated Mar. 3, 2014 issued by the State Intellectual Property Office of the People's Republic of China in counterpart Chinese Patent Application No. 200880125936.X.

Communication dated Mar. 31, 2014 issued by the European Patent Office in counterpart European Patent Application No. 08 873 334.0.

* cited by examiner

IMAGE PROCESSING METHOD AND APPARATUS, IMAGE REPRODUCING METHOD AND APPARATUS, AND RECORDING MEDIUM

CROSS-REFERENCE TO RELATED PATENT APPLICATION

This application claims priority from Korean Patent Application No. 10-2008-0022999, filed Mar. 12, 2008 in the Korean Intellectual Property Office, the disclosure of which is incorporated herein in its entirety by reference.

BACKGROUND OF THE INVENTION

1. Field of the Invention

Methods and apparatuses consistent with the present invention relate to image processing and image reproduction and more particularly, to reproducing a three-dimensional (3D) image by inserting additional information into a 3D image.

2. Description of the Related Art

Recently, research into 3D images, such as stereoscopic images displayed on digital televisions (DTVs) has been conducted. In order to reproduce images in DTVs, analog signals, such as video signals, audio signals, or other data signals, are converted into digital signals which are compressed and transmitted. The DTVs receive the transmitted digital signals and convert the digital signals back into the analog video signals, audio signals, or other data signals. Thus, the DTVs can provide a high-definition service compared to conventional analog TVs.

A conventional 3D image data interface is defined only with respect to two-dimensional (2D) images. A conventional image processing apparatus sends 3D image data to an image display apparatus, such as a TV, and the image display apparatus displays the received image data as it is, regardless of whether the received image data is a 2D image or a 3D image.

There is a need to define a 3D image data interface to perform a future 3D image service. Also, there is a need to provide apparatuses and methods for transmitting additional information related to a 3D image to an image display apparatus or another device to efficiently reproduce the 3D image.

SUMMARY OF THE INVENTION

The present invention provides an image processing method and apparatus and an image reproducing method and apparatus which can realize a three-dimensional (3D) image stream for transmitting a 3D image and additional information related to the 3D image together to guarantee compatibility with a conventional image stream and also to efficiently reproduce the 3D image.

According to an aspect of the present invention, there is provided an image processing method including: receiving 3D image data; generating additional information about the 3D image data; and inserting the additional information in a blanking interval of the 3D image data.

The blanking interval may be one of a vertical blanking interval and a horizontal blanking interval.

The additional information may include 3D image information representing whether the received image data is two-dimensional image data or 3D image data.

The additional information may include depth image information representing whether the received image data is depth image data or not.

If the received image data is the depth image data, the additional information may further include information representing a maximum distance and a minimum distance between a camera for photographing a predetermined object and the object.

The additional information may include camera parameter information representing whether the received image data is image data including a camera parameter or not.

If the received image data is image data including the camera parameter, the additional information may further include at least one of a translation parameter, a rotation parameter, and a focal length parameter.

The additional information may include information about a display format of the 3D image.

The display format of the 3D image may include one of side by side, top and bottom, frame sequential, field sequential, interleaved, pixel by pixel, and depth image.

The additional information may include view information with respect to the 3D image.

The view information of the 3D image may include information about a reference view of the 3D image.

The method may further include sending the 3D image data in which the additional information is inserted to a predetermined device or a predetermined system.

According to another aspect of the present invention, there is provided an image processing apparatus including: an image data receiving unit receiving 3D image data; an additional information generating unit generating additional information about the 3D image data; and an additional information inserting unit inserting the additional information in a blanking interval of the 3D image data.

According to another aspect of the present invention, there is provided an image reproducing method including: receiving 3D image data and additional information about the 3D image data included in a blanking interval of the 3D image data; extracting the additional information from the 3D image data; and reproducing the 3D image data on the basis of the additional information.

According to another aspect of the present invention, there is provided an image reproducing apparatus including: an image data receiving unit receiving 3D image data and additional information about the 3D image data included in a blanking interval of the 3D image data; an additional information extracting unit extracting the additional information from the 3D image data; and a reproducing unit reproducing the 3D image data on the basis of the additional information.

According to another aspect of the present invention, there is provided a computer-readable recording medium having embodied thereon a program for executing an image processing method, including: receiving 3D image data; generating additional information about the 3D image data; and inserting the 3D image data in a blanking interval of the 3D image data.

According to another aspect of the present invention, there is provided a computer-readable recording medium having embodied thereon a program for executing an image reproducing method, the image reproducing method including: receiving 3D image data and additional information about the 3D image data included in a blanking interval of the 3D image data; extracting the additional information from the 3D image data; and reproducing the 3D image data on the basis of the additional information.

BRIEF DESCRIPTION OF THE DRAWINGS

The above and other aspects of the present invention will become more apparent by describing in detail exemplary embodiments with reference to the attached drawings in which.

DETAILED DESCRIPTION OF THE INVENTION

The present invention is described with reference to the accompanying drawings, in which exemplary embodiments of the invention are shown.

Figure 1:
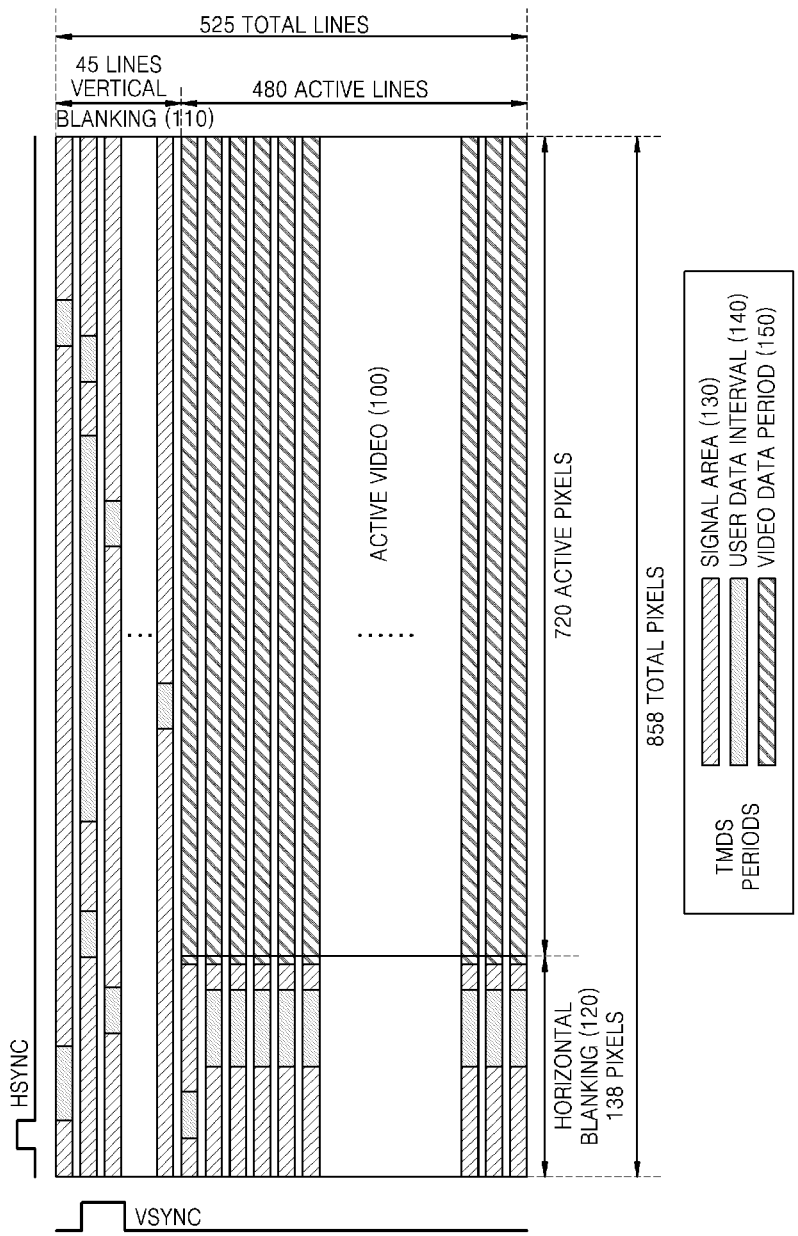
FIG. 1 is a view illustrating an example of a digital image stream.

FIG. 1 is a view illustrating an example of a digital image stream. Referring to FIG. 1, the digital image stream includes an active video interval 100, a vertical blanking interval 110, and a horizontal blanking interval 120. The active video interval 100 includes a video signal and an audio signal which are displayed on an image display apparatus. The vertical blanking interval 110 and the horizontal blanking interval 120 include a data area which is not displayed on the image display apparatus, such as the signal area 130 and the user data area 140. The vertical blanking interval 110 and the horizontal blanking interval 120 are used to transmit time codes, closed captions, teletexts, or the like.

Figure 2:
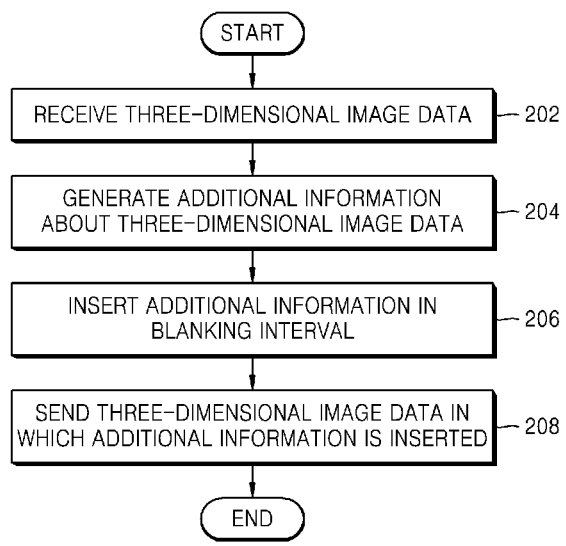
FIG. 2 is a flowchart of an image processing method according to an exemplary embodiment of the present invention.

FIG. 2 is a flowchart of an image processing method according to an exemplary embodiment of the present invention.

The image processing method according to an exemplary embodiment of the present invention realizes a 3D image stream which is compatible with a conventional image stream by transmitting a 3D image along with additional information related to the 3D image. The additional information related to the 3D image data may be inserted in a blanking interval of the 3D image data. The blanking interval is a vertical blanking interval 110 in which an electron beam is not emitted until a scanning operation on the next scanning line is started after a scanning operation on a current scanning line is finished, or a horizontal blanking interval 120 in which an electron beam is not emitted until a scanning operation on another field is started after a scanning operation on a current field is finished.

Referring to FIG. 2, in operation 202, an image processing apparatus receives 3D image data. The image processing apparatus according to an exemplary embodiment may be installed in a Blu-ray disk (BD) player or a digital versatile disk (DVD) player. The 3D image data may include a multi-view stereoscopic image.

In operation 204, the image processing apparatus generates additional information about the 3D image data. In an exemplary embodiment, the additional information includes information about the 3D image data received in operation 202.

The additional information about the 3D image data may include information which indicates whether the image data is 2D image data or 3D image data. For example, the image processing apparatus may record "1" in a predetermined area where user data of the vertical blanking interval 110 may be recorded with respect to the 3D image data, and may record "0" in a predetermined area where user data of the vertical blanking interval 110 may be recorded with respect to the 2D image data.

For example, the additional information about the 3D image data may include depth image information to indicate whether the image data is depth image data or not. For example, if the depth image information has a value of "1", it may denote that the depth image data and additional information related to the depth image data are received by the image processing apparatus. If the depth image information has a value of "0", it may denote that the received image data is not the depth image data.

If the image data received by the image processing apparatus is the depth image data, the additional information related to the depth image data may include a maximum distance max_depth and a minimum distance min_depth between a camera for photographing a predetermined object and the object.

For example, the additional information related to the 3D image data may include camera parameter information which indicates whether the image data is the image data including a camera parameter. For example, if the camera parameter information has a value of "1", it may denote that the image data includes the camera parameter. Thus, the additional information including the camera parameter is received by the image processing apparatus. If the camera parameter information has a value of "0", it may denote that the received image data does not include the additional information related to the camera parameter.

If the image data received by the image processing apparatus is the image data including the camera parameter, the additional information related to the camera parameter may include a translation parameter, a rotation parameter, a focal length parameter, or the like. The translation parameter is a difference vector between a left view and a right view from the origin. If the image data is a multi-view image, the translation parameter may include three coordinate values of x, y, and z. If the image data is a two view image, the translation parameter may include a value only for a baseline distance. The rotation parameter is a 3D camera pose angle based on world coordinates. If the image data is a multi-view image, the rotation parameter may include three angle values of a, b, and c. The focal length parameter denotes a distance between an optical center and an image plane.

As another example, the additional information about the 3D image data may include information about a display format of the 3D image. The display format of the 3D image may include side by side, top and bottom, frame sequential, field sequential, interleaved, pixel by pixel, depth image, or the like.

For example, if the information about the display format of the 3D image has values of "000", "001", "010", and "011", it may denote that image data of the side by side format, top and bottom format, frame sequential format, and field sequential format are received, respectively.

As another example, the additional information about the 3D image data may include information about a view of the 3D image. For example, if the information about the view of the 3D image has values of "00000", "00001", and "00010", it may denote that the received image data is a reference image (for example, a left image), a first view image, and a second view image, respectively.

In operation 206, the image processing apparatus inserts the additional information about the 3D image data generated in operation 204 in the blanking interval of the 3D image data. The blanking interval includes the vertical blanking interval 110 or the horizontal blanking interval 120.

In operation 208, the image processing apparatus sends the 3D image data, in which the additional information is inserted, to a device or a system including an image reproducing apparatus, as described in detail below. The aforementioned image processing method may be used as an interface between devices or between systems.

For example, in the Society of Motion Picture and Television Engineers (SMPTE) 291M standard, which is a digital video interface standard, the additional information about the 3D image data may be inserted in a vertical ancillary (VANC) data area of the vertical blanking interval or in a horizontal ancillary (HANC) data area of the horizontal blanking interval.

Also, the SMPTE 291M standard defines an ancillary data packet format for the additional information to be inserted. The ancillary data packet format includes ancillary data flags (ADFs), data identification (DID), second data ID (SDID), data block numbers (DBNs), data count (DC), data validity checksum (CS), and user data.

If the VANC data area is used, the additional information about the 3D image, for example, the 3D image information, depth image information, camera parameter information, or the like, is inserted in the user data area of the ancillary data packet format. If the HANC data area is used, the additional information about the 3D image may be inserted in the user data area of the ancillary data packet format by defining the user data area according to a method similar to defining the VANC data area.

As another example, if an interface between systems, for example, is a high definition multimedia interface (HDMI), the additional information about the 3D image that is not inserted in an active video area, may be inserted in a data island interval, that is, the user data area 140, of the vertical blanking interval or the horizontal blanking interval. The 3D image information, the depth image information, the display format information, the image view information, the camera parameter information, or the like may be inserted in the packet data of the data island interval.

As another example, if an interface between systems, for example, is a display port, the additional information about the 3D image that is not inserted in the active video area, may be inserted in a secondary data packet of the vertical blanking interval or the horizontal blanking interval. The 3D image information, the depth image information, the display format information, the image view information, the camera parameter information, or the like may be inserted in the audio video interleave (AVI) packet or MPEG source packet types of the secondary data packet.

As a modified example, if the SMPTE 292M interface is used, additional information about the 3D image may be provided using line number data posterior to an end of active video (EAV) instead of the VAHC data area or the HANC data area.

Figure 3:
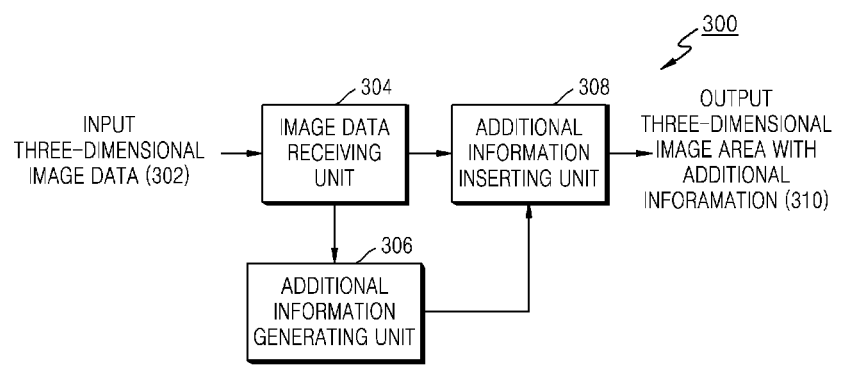
FIG. 3 is a block diagram illustrating an image processing apparatus according to an exemplary embodiment of the present invention.

FIG. 3 is a block diagram illustrating an image processing apparatus 300 according to an exemplary embodiment of the present invention.

Referring to FIG. 3, the image processing apparatus 300 according to an exemplary embodiment of the present invention includes an image data receiving unit 304, an additional information generating unit 306, and an additional information inserting unit 308. The image processing apparatus 300 according to an exemplary embodiment of the present invention may be installed in a BD player, a DVD player, or the like.

The image data receiving unit 304 receives 3D image data 302 which includes a multi-view stereoscopic image.

The additional information generating unit 306 generates additional information about the 3D image data 302. The additional information about the 3D image data 302 may include the 3D image information, the depth image information, the camera parameter information, the display format information of the 3D image, or the view information of the 3D image as described above.

The additional information inserting unit 308 inserts the generated additional information about the 3D image data 302 in the blanking interval of the 3D image data. The blanking interval includes the vertical blanking interval 110 or the horizontal blanking interval 120.

The image processing apparatus 300 according to an exemplary embodiment of the present invention may further include a sending unit which sends the 3D image data 310 including the inserted additional information, to a predetermined device a predetermined system or the like for display, further processing, data manipulation or the like.

Figure 4:
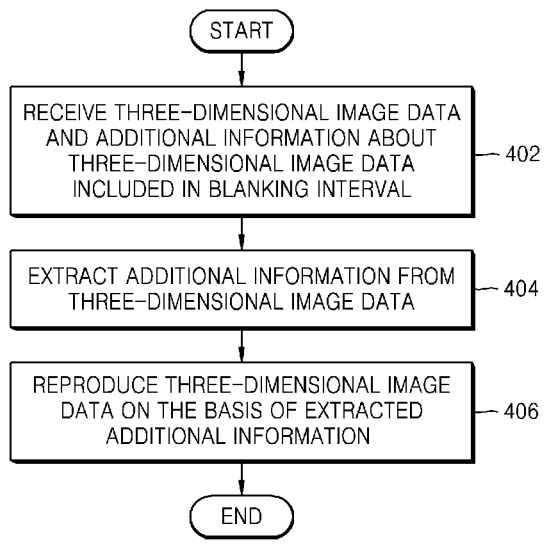
FIG. 4 is a flowchart of an image reproducing method according to an exemplary embodiment of the present invention.

FIG. 4 is a flowchart of an image reproducing method according to an exemplary embodiment of the present invention.

Referring to FIG. 4, in operation 402, an image reproducing apparatus receives 3D image data and additional information about the 3D image data included in a blanking interval of the 3D image data. The image reproducing apparatus according to an exemplary embodiment may be installed in a display apparatus such as a TV. The 3D image data includes a multi-view stereoscopic image. The blanking interval includes the vertical blanking interval 110 or the horizontal blanking interval 120.

In operation 404, the image reproducing apparatus extracts the additional information from the 3D image data. The additional information about the 3D image data may include the 3D image information, the depth image information, the camera parameter information, the display format information of the 3D image, or the view information of the 3D image as described above.

If the image data received by the image reproducing apparatus is depth image data, the additional information about the 3D image data may include information representing a maximum distance and a minimum distance between a camera for photographing a predetermined object and the object. If the image data received by the image reproducing apparatus includes a camera parameter, the additional information about the 3D image data may include at least one of a translation parameter, a rotation parameter, and a focal length parameter.

A display format of the 3D image may include side by side, top and bottom, frame sequential, field sequential, interleaved, pixel by pixel, depth image, or the like.

In operation 406, the image reproducing apparatus reproduces the 3D image data received in operation 402, on the basis of the additional information extracted in operation 404.

Figure 5:
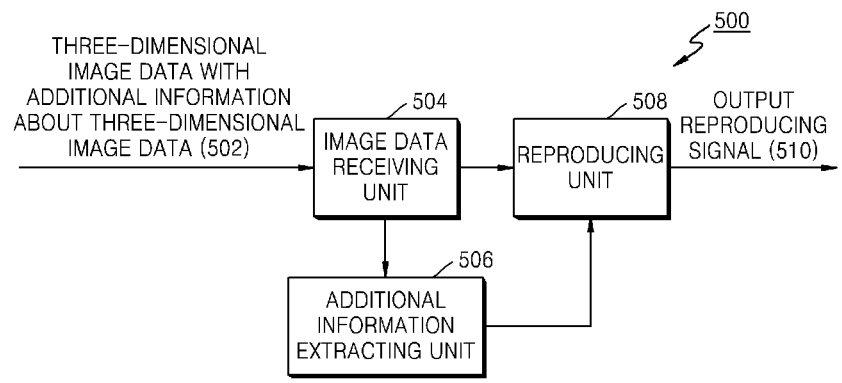
FIG. 5 is a block diagram illustrating an image reproducing apparatus according to an exemplary embodiment of the present invention.

FIG. 5 is a block diagram illustrating an image reproducing apparatus 500 according to an exemplary embodiment of the present invention.

Referring to FIG. 5, the image reproducing apparatus 500 according to an exemplary embodiment of the present invention includes an image data receiving unit 504, an additional information extracting unit 506, and a reproducing unit 508.

The image data receiving unit 504 receives 3D image data including additional information 502 about the 3D image data included in a blanking interval of the 3D image data.

The additional information extracting unit 506 extracts the additional information about the 3D image data from the 3D image data 502 received by the image data receiving unit 504.

The reproducing unit 508 outputs the reproducing signal 510 for reproducing the 3D image data, on the basis of the additional information extracted by the additional information extracting unit 506. The 3D image data may be reproduced on a display apparatus.

The present invention may also be embodied as computer-readable code on a computer-readable recording medium. The computer-readable recording medium may include any data storage device that can store data which may be thereafter read by a computer system. Examples of the computer-readable recording medium include read-only memory (ROM), random-access memory (RAM), CD-ROMs, magnetic tapes, floppy disks, optical data storage devices, and flash memory. The computer-readable recording medium may also be distributed over network coupled computer systems so that the computer readable code is stored and executed in a distributed fashion.

According to exemplary embodiments of the present invention, additional information about 3D image data is inserted in a blanking interval of the 3D image data, so that a 3D image stream for guaranteeing compatibility with a conventional image stream and transmitting a 3D image along with additional information related to the 3D image may be realized.

While the present invention has been particularly shown and described with reference to exemplary embodiments thereof, it will be understood by one of ordinary skill in the art that various changes in form and details may be made therein without departing from the spirit and scope of the present invention as defined by the following claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. An image processing method comprising:
   receiving three-dimensional (3D) image data;
   generating additional information about the 3D image data; and
   inserting the additional information in a user data area related to the 3D image data,
   wherein the user data area comprises a data island interval of a blanking interval, and
   the generated additional information comprises a parameter which defines an interface for displaying the 3D image data on a two-dimensional (2D) image display apparatus.

2. The method of claim 1, wherein the blanking interval comprises one of a vertical blanking interval and a horizontal blanking interval.

3. The method of claim 1, wherein the additional information comprises depth image information indicating whether the received image data is depth image data or not.

4. The method of claim 3, wherein if the received image data is the depth image data, the additional information further comprises information indicating a maximum distance and a minimum distance between an object and a camera for photographing the object.

5. The method of claim 1, wherein the additional information comprises camera parameter information indicating whether the received image data is the image data comprising a camera parameter.

6. The method of claim 5, wherein if the received image data is image data comprising the camera parameter, the additional information further comprises at least one of a translation parameter, a rotation parameter, and a focal length parameter.

7. The method of claim 1, wherein the additional information comprises information about a display format of the 3D image.

8. The method of claim 7, wherein the display format of the 3D image comprises one of side by side, top and bottom, frame sequential, field sequential, interleaved, pixel by pixel, and depth image.

9. The method of claim 1, wherein the additional information comprises view information with respect to the 3D image.

10. The method of claim 9, wherein the view information of the 3D image comprises information about a reference view of the 3D image.

11. The method of claim 1 further comprising:
    sending the 3D image data, in which the additional information is inserted, to be displayed.

12. An image processing apparatus comprising:
    an image data receiving unit which receives 3D image data;
    an additional information generating unit which generates additional information about the 3D image data; and
    an additional information inserting unit which inserts the additional information in a user data area related to the 3D image data,
    wherein the user data area comprises a data island interval of a blanking interval, and
    the generated additional information comprises a parameter which defines an interface for displaying the 3D image data on a two-dimensional (2D) image display apparatus.

13. An image reproducing method comprising:
    receiving 3D image data and additional information about the 3D image data included in a user data area related to the 3D image data;
    extracting the additional information from the 3D image data; and
    reproducing the 3D image data based on the extracted additional information,
    wherein the user data area comprises a data island interval of a blanking interval, and
    the generated additional information comprises a parameter which defines an interface for reproducing the received 3D image data on a two-dimensional (2D) image display apparatus.

14. The method of claim 13, wherein the blanking interval is one of a vertical blanking interval and a horizontal blanking interval.

15. The method of claim 13, wherein the additional information comprises depth image information indicating whether the received image data is depth image data.

16. The method of claim 15, wherein if the received image data is the depth image data, the additional information further comprises information indicating a maximum distance and a minimum distance between an object and a camera for photographing the object.

17. The method of claim 13, wherein the additional information comprises camera parameter information indicating whether the camera parameter information is the image data comprising a camera parameter.

18. The method of claim 17, wherein if the received image data is the image data comprising the camera parameter, the additional information further comprises at least one of a translation parameter, a rotation parameter, and a focal length parameter.

19. The method of claim 13, wherein the additional information comprises information about a display format of the 3D image.

20. The method of claim 19, wherein the display format of the 3D image comprises one of side by side, top and bottom, frame sequential, field sequential, interleaved, pixel by pixel, and depth image.

21. The method of claim 13, wherein the additional information comprises view information of the 3D image.

22. The method of claim 21, wherein the view information of the 3D image comprises information about a reference view of the 3D image.

23. An image reproducing apparatus comprising:
an image data receiving unit which receives 3D image data and additional information about the 3D image data included in a user data area related to the 3D image data;
an additional information extracting unit which extracts the additional information from the 3D image data; and
a reproducing unit which reproduces the 3D image data based on the extracted additional information,
wherein the user data area comprises a data island interval of a blanking interval, and
the generated additional information comprises a parameter which defines an interface for reproducing the received 3D image data, by the reproducing unit, on a two-dimensional (2D) image display apparatus.

24. A non-transitory computer-readable recording medium having embodied thereon a program for executing an image processing method comprising:
receiving 3D image data;
generating additional information about the 3D image data; and
inserting the 3D image data in a user data area related to the 3D image data,
wherein the user data area comprises a data island interval of a blanking interval, and
the generated additional information comprises a parameter which defines an interface for displaying the 3D image data on a two-dimensional (2D) image display apparatus.

25. A non-transitory computer-readable recording medium having embodied thereon a program for executing an image reproducing method comprising:
receiving 3D image data and additional information about the 3D image data included in a user data area related to the 3D image data;
extracting the additional information from the 3D image data; and
reproducing the 3D image data based on the extracted additional information,
wherein the user data area comprises a data island interval of a blanking interval, and
the generated additional information comprises a parameter which defines an interface for reproducing the received 3D image data on a two-dimensional (2D) image display apparatus.

26. The method of claim 1, wherein the generating comprises generating the parameter about the 3D image data that has been received, and
the inserting comprises inserting the parameter in the data island interval of the 3D data that has been received.

* * * * *